United States Patent Office 3,288,796
Patented Nov. 29, 1966

3,288,796
4-AMINO-3,5,6-TRICHLOROPICOLINIC ACID SALTS
Hugh T. Harrison, Tulsa, Okla., assignor to The Dow Chemical Company, Midland, Mich., a corporation of Delaware
No Drawing. Filed Nov. 18, 1964, Ser. No. 412,236
3 Claims. (Cl. 260—271)

This is a continuation-in-part of copending application Serial No. 340,486, filed Januaryy 27, 1964, which, in turn, was a continuation-in-part of the then co-pending application Serial No. 203,454, filed June 19, 1962, both now abandoned.

The present invention is directed to the novel salts of hexafluoroarsenic or hexafluorophosphoric acid and 4-amino-3,5,6-trichloropicolinic acid. These compounds correspond to one of the formulae:

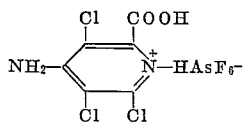

and

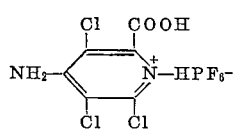

The present compounds are solid materials, of low solubility in water and of low to moderate solubility in organic solvents. They are useful as parasiticides, and are adapted to be employed in the control of insect, arachnid, bacterial and fungal pests such as *Tetranychus bimaculatus* (two-spotted spider mite), *Aonidiella aurantii* (California red scale), brown rot, *Aerobacter aerogenes*, *Pseudomonas aeruginosa*, *Salmonella typhosa*, *Staphylococcus aureus*, *Rhizopus nigricans*, and the like.

The novel compounds are prepared by reacting hexafluoroarsenic acid or hexafluorophosphoric acid and 4-amino-3,5,6-trichloropicolinic acid. Conveniently, the reaction is carried out in an inert liquid reaction medium, such as water. Some of the desired product is obtained when employing the reactants in any amounts. However, the reaction consumes the reactants in amounts which represent equimolecular proportions and it is preferred to employ the reactants in such amounts. The reaction is exothermic and takes place smoothly at temperatures of from 20° to 100° C., and preferably at temperatures of from 20° to 40° C.

In carrying out the reaction, the hexafluoroarsenic acid or hexafluorophosphoric acid is contacted with the 4-amino-3,5,6-trichloropicolinic acid in any conventional manner. The contacting is conveniently carried out by adding one reactant to the other. Often-times it is convenient to employ the hydrate form of the acid, such as, for example, hexafluoroarsenic acid hexahydrate, hexafluorophosphoric acid hexahydrate (melting at 31° C.), and hexafluorophosphoric acid octahydrate. The temperature of the resulting reaction medium can be controlled by regulating the rate of the contacting of the reactants as well as by external heat exchange. Sometimes the desired product precipitates in the mixture during the reaction. Where desirable to maintain fluid condition, such product can be separated in part from fluid portions of the mixture by conventional procedures. Upon completion of the contacting of the reactants, most of the reaction will have taken place with the production of the desired product. Where optimum yields are desired, it is often convenient that the reaction mixture be allowed to stand several hours or longer under reaction conditions to insure substantial completion of reaction. Upon completion of the reaction, the reaction medium can be removed from the reaction mixture by evaporation or distillation under reduced pressure to obtain the salt product as a residue. This product can be further purified by conventional procedures such as washing with water or suitable organic liquid and recrystallization.

In a representative operation, 54 grams of 4-amino-3,5,6-trichloropicolinic acid (0.20 mole) are added portion wise and with stirring to an aqueous 65 percent solution of hexafluorophosphoric acid (containing 0.22 mole of $HPF_6$). The aqueous $HPF_6$ solution employed herein is a commercial product containing 65 percent $HPF_6$, 21 percent of $H_2O$, and 14 percent of related phosphorus acids. The addition is carried out over a period of fifteen minutes and at room temperature. Subsequently the reaction mixture is permitted to stand for about thirty minutes at room temperature, with stirring throughout the time, to complete the reaction. The reaction medium is thereafter removed from the reaction mixture by evaporation under vacuum to obtain the crystalline 4-amino-3,5,6-trichloropicolinic acid hexafluorophosphate product as a residue. This product is washed with diethyl ether and dried. It melts at 230°–232° C., with decomposition, and has a molecular weight of 387.5.

In a similar manner, 4-amino-3,5,6-trichloropicolinic acid hexafluoroarsenate is prepared by reacting together 4-amino-3,5,6-trichloropicolinic acid and hexafluoroarsenic acid. This product melts at 198°–200° C., and is of low solubility in acetone and water. The hexafluoroarsenic acid employed as reactant is a solution, commercially available, containing 65 percent $HAsF_6$, 21 percent of $H_2O$, and 14 percent of related arsenic acids.

The subject compounds are useful as parasiticides in various insecticidal, nematocidal and antimicrobial compositions. For such use, the unmodified compounds can be employed. However, the present invention also encompasses the use of the compounds together with a parasiticide adjuvant. In such use, the compounds can be dispersed upon a finely divided solid, such as, for example, pyrophyllite, diatomaceous earth, or gypsum, and the resulting preparations employed as dusts. Also, such mixtures can be dispersed in water with the aid of a wetting agent and the resulting aqueous suspensions employed as sprays. In other procedures, the products can be employed as constituents of organic liquid compositions, in which the organic liquid can be, for example, petroleum oils or distillates, toluene, liquid halohydrocarbons, or synthetic organic oils; oil-in-water or water-in-oil emulsions; or water dispersions with or without the addition of wetting, dispersing, or emulsifying agents. Representative dispersing agents include the polyoxyethylene derivatives of sorbitan esters and complex ether alcohols.

In representative operations, there is achieved a 100 percent kill of a heavy population of *Tetranychus bimaculatus* (two-spotted spider mite) on young bean plants when the infested plants are thoroughly wetted briefly with an aqueous spray composition containing 500 parts of 4-amino-3,5,6-trichloropicolinic acid hexafluoroarsenate per million parts by weight of ultimate spray composition. The same percent kill is obtained when the compound employed is 4-amino-3,5,6-trichloropicolinic acid hexafluorophosphate.

In other operations, 4-amino-3,5,6-trichloropicolinic acid hexafluorophosphate is evaluated in conventional procedures for its effect upon the growth of various bacterial organisms. In these operations, the compound is dispersed in a solvent to obtain a saturated solvent solution. Thereafter, the solvent solution is dispersed in melted nutrient agar to produce two bacteriological culture media. One of the media is inoculated with *Staphylococcus aureus,* the other, with *Pseudomonas aeruginosa*. The media are incubated for 3 days at 30° C. and thereupon examined to determine whether there has been growth of bacterial organisms in either of the media. It is found that each of the media is free of bacterial organisms.

The 4-amino-3,5,6-trichloropicolinic acid to be employed as starting material in preparing the compounds of the present invention is readily prepared by heating together, at about 150° C. and for about an hour, 75 percent aqueous sulfuric acid and 4-amino-2,3,5-trichloro-6 - (trichloromethyl)pyridine. Hydrogen chloride is evolved; product is recovered in good purity by gross dilution of the resulting reaction mixture, to obtain a dilute aqueous acid medium in which 4-amino-3,5,6-trichloropicolinic acid is insoluble. The dilute acid is filtered and residue saved and washed with water to obtain the said starting material.

The 4-amino-2,3,5-trichloro-6-(trichloromethyl)-pyridine starting material employed in the preparation of 4-amino-3,5,6-trichloropicolinic acid can be prepared by mixing together and reacting an excess of ammonia and 2,3,4,5-tetrachloro-6-(trichloromethyl)pyridine at a temperature of about 80° C., preferably in a sealed vessel at autogenous pressure. The 4-amino-2,3,5-trichloro-6-(trichloromethyl)pyridine compound starting material is thereafter recovered by conventional procedures.

The 2,3,4,5 - tetrachloro-6-(trichloromethyl)-pyridine employed in the preparation of 4-amino-2,3,5-trichloro-6-(trichloromethyl)pyridine can be prepared by the chlorination of 2-picoline with gaseous chlorine in the presence of a saturant amount of hydrogen chloride and under ultraviolet light, at about 110° C. The chlorinated product is recovered by neutralizating the mixture resulting from chlorination, and extracting the 2,3,4,5-tetrachloro-6-(trichloromethyl)pyridine with, for example, diethyl ether or pentane.

I claim:
1. The salt of 4-amino-3,5,6-trichloropicolinic acid and a member of the group consisting of hexafluoroarsenic acid and hexafluorophosphoric acid.
2. 4-amino-3,5,6-trichloropicolinic acid hexafluoroarsenate.
3. 4 - amino-3,5,6-trichloropicolinic acid hexafluorophosphate.

References Cited by the Examiner

UNITED STATES PATENTS 1,915,334 6/1933 Salzberger et al. _____ 260—290
2,362,614 11/1944 Calva _____ 167—22

OTHER REFERENCES

Van Wazer: "Phosphorous and Its Compounds," vol. I," Interscience 1958, pages 803, 804, 808, 809.

Lange et al.: Ber. Deut. Chem., vol. 63B, pp. 1058, 1059, 1062, 1068 and 1069 (1930).

ALEX MAZEL, *Primary Examiner.*

HENRY R. JILES, *Examiner.*

D. G. DAUS, *Assistant Examiner.*